United States Patent
Ayhan et al.

(10) Patent No.: US 12,033,522 B2
(45) Date of Patent: Jul. 9, 2024

(54) CONTROLLING AERIAL VEHICLES TO TRAVEL ALONG AIR CORRIDORS BASED ON TRAINED AIR CORRIDOR MODELS

(71) Applicant: The Boeing Company, Chicago, IL (US)

(72) Inventors: Samet M. Ayhan, Fairfax, VA (US); Ian Andrew Byham Wilson, Port Orange, FL (US)

(73) Assignee: The Boeing Company, Chicago, IL (US)

(*) Notice: Subject to any disclaimer, the term of this patent is extended or adjusted under 35 U.S.C. 154(b) by 303 days.

(21) Appl. No.: 17/692,015

(22) Filed: Mar. 10, 2022

(65) Prior Publication Data

US 2022/0327937 A1   Oct. 13, 2022

Related U.S. Application Data

(60) Provisional application No. 63/172,982, filed on Apr. 9, 2021.

(51) Int. Cl.
| | | |
|---|---|---|
| *G08G 5/00* | (2006.01) | |
| *G06N 7/00* | (2023.01) | |
| *G06N 7/01* | (2023.01) | |
| *G08G 5/04* | (2006.01) | |

(52) U.S. Cl.
CPC ............ *G08G 5/006* (2013.01); *G06N 7/01* (2023.01); *G08G 5/003* (2013.01); *G08G 5/0043* (2013.01); *G08G 5/0069* (2013.01); *G08G 5/045* (2013.01)

(58) Field of Classification Search
CPC ...... G08G 5/006; G08G 5/003; G08G 5/0043; G08G 5/0069; G08G 5/045; G08G 5/0039; G08G 5/0021; G08G 5/0017; G08G 5/0004; G08G 5/0073; G06N 7/01; G05D 1/106
See application file for complete search history.

(56) References Cited

U.S. PATENT DOCUMENTS

| | | | | |
|---|---|---|---|---|
| 5,623,413 A | * | 4/1997 | Matheson | G06Q 10/08 246/2 R |
| 6,006,158 A | * | 12/1999 | Pilley | G01S 19/15 701/120 |
| 11,645,927 B2 | * | 5/2023 | Meringer | G08G 5/0039 701/120 |

(Continued)

*Primary Examiner* — Mussa A Shaawat
(74) *Attorney, Agent, or Firm* — Jordan IP Law, LLC

(57) ABSTRACT

The disclosure herein describes use of an air corridor model to enable aerial vehicles to travel an air corridor while maintaining safe separation distance from other vehicles. A trained air corridor model associated with an air corridor is received by an aerial vehicle, wherein the trained air corridor model is configured to maintain safe separation distance between vehicles in the air corridor. The current position of the aerial vehicle in the air corridor is identified and positions of other agents in the air corridor are received. A next position of the aerial vehicle is determined based on the trained air corridor model, the current position, and the agent positions. The aerial vehicle is controlled to travel from the current position to the determined next position, whereby the aerial vehicle and other agents are enabled to efficiently use the airspace of the air corridor while maintaining safe distances between each other.

20 Claims, 7 Drawing Sheets

(56) References Cited

U.S. PATENT DOCUMENTS

| | | | |
|---|---|---|---|
| 2009/0171557 A1* | 7/2009 | Brozat | G06Q 10/0633 |
| | | | 701/120 |
| 2012/0218127 A1* | 8/2012 | Kroen | G08G 5/0052 |
| | | | 340/945 |
| 2012/0245836 A1* | 9/2012 | White | G08G 5/06 |
| | | | 701/120 |
| 2014/0309821 A1* | 10/2014 | Poux | B64D 45/00 |
| | | | 701/14 |
| 2016/0275801 A1* | 9/2016 | Kopardekar | G08G 5/0082 |
| 2016/0335567 A1* | 11/2016 | Petersen | G06Q 10/06312 |
| 2018/0144643 A1* | 5/2018 | Moravek | G08G 5/0021 |
| 2018/0322793 A1* | 11/2018 | Huang | G08G 5/0091 |
| 2018/0373243 A1* | 12/2018 | Russell | G08G 5/0039 |
| 2019/0057327 A1* | 2/2019 | Arguello | G06N 7/01 |
| 2019/0147748 A1* | 5/2019 | Boozarjomehri | G08G 5/0039 |
| | | | 701/120 |
| 2019/0236966 A1* | 8/2019 | Borgyos | G08G 5/0069 |
| 2019/0317530 A1* | 10/2019 | Yang | G08G 5/0013 |
| 2020/0394927 A1* | 12/2020 | Neubauer | G08G 5/0026 |
| 2021/0020049 A1* | 1/2021 | Nathan | G08G 5/0021 |
| 2021/0125507 A1* | 4/2021 | Haider | G08G 5/0026 |
| 2021/0183255 A1* | 6/2021 | Van Tulder | G08G 5/0013 |
| 2021/0358310 A1* | 11/2021 | Sachs | G08G 5/0039 |
| 2022/0172629 A1* | 6/2022 | Sprengart | G08G 5/0026 |
| 2023/0073270 A1* | 3/2023 | Moon | H04Q 11/04 |

\* cited by examiner

CONTROLLING AERIAL VEHICLES TO TRAVEL ALONG AIR CORRIDORS BASED ON TRAINED AIR CORRIDOR MODELS

BACKGROUND

The advent of Advanced Aerial Mobility (AAM), also referred to as Urban Air Mobility (UAM) will bring air taxis and Cargo Air Vehicles (CAVs) into reality, raising new challenges as they will share the same airspace, where conventional aircraft and small Unmanned Aircraft Systems (sUAS) operate at up to 2500 ft Above Ground Level (AGL). This concurrent use of airspace by UAS Traffic Management (UTM), conventional Air Traffic Management (ATM) and AAM operations require an AAM System that can accommodate wide variety and vast volume of aerial vehicles in an efficient and scalable manner, supported by a development of safe control and separation rules and regulations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure enable aerial vehicles to efficiently travel through an air corridor while maintaining a safe separation distance at least by receiving, by a processor of an aerial vehicle, a trained air corridor model associated with an origin, a destination, and an air corridor representative of airspace between the origin and the destination, wherein the trained air corridor model is configured to maintain safe separation distance between vehicles in the air corridor; identifying, by the processor, current position data representing a current position of the aerial vehicle in the air corridor; receiving, by the processor, agent position data associated with a position of at least one agent vehicle in the air corridor; and determining, by the processor, a next position of the aerial vehicle in the air corridor based on the trained air corridor model, the current position data, and the agent position data.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
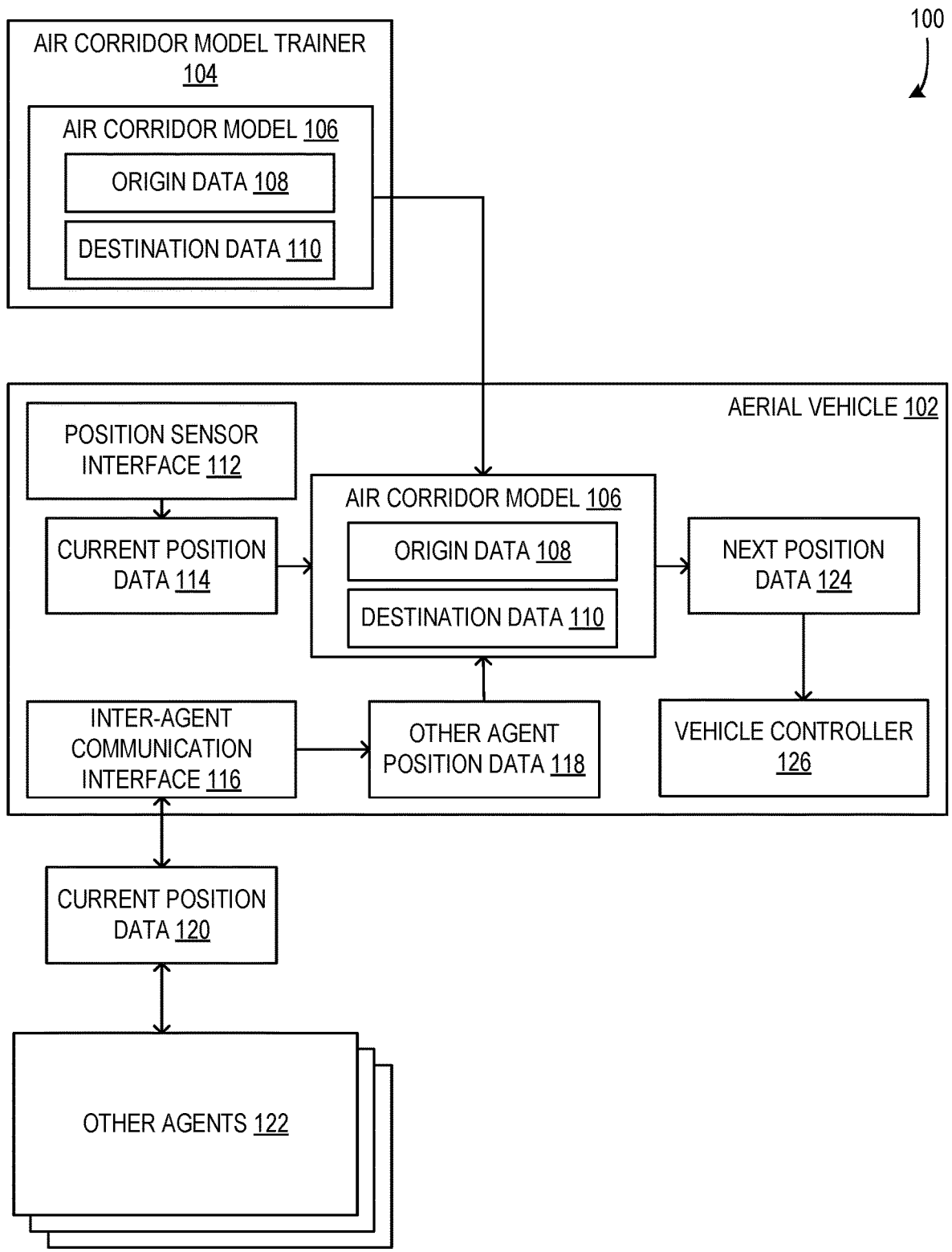
FIG. 1 is a block diagram illustrating a system for enabling an aerial vehicle to travel in an air corridor while maintaining safe separation from other vehicles according to an embodiment.

Systems and methods for controlling aerial vehicles travelling in an air corridor based on a trained air corridor model are described. The described systems and methods include training a decision model using a simulated air corridor and simulated vehicles traveling therein using machine learning techniques. Further, the model is embedded or otherwise installed in aerial vehicles which are configured to use the model to determine a route of travel through an associated air corridor while maintaining safe separation distance from other vehicles therein. More specifically, the described Advanced Aerial Mobility (AAM) system is based on using Multi-Agent Reinforcement Learning (MARL) to efficiently plan the motion of safely separated voluminous piloted and autonomous aerial vehicles in a defined air corridor. The described MARL-based model enables the AAM system to manage a diverse set of multiple aerial vehicles in the defined air corridor up to the corridor's saturation level.

The described method and system use a trained air corridor model associated with an air corridor, which is received by each aerial vehicle, wherein the trained air corridor model is configured to maintain safe separation distance between vehicles in the air corridor. The current position of each aerial vehicle in the air corridor is identified and positions of other vehicles in the air corridor are received by each aerial vehicle. A next position of each aerial vehicle is determined by each vehicle based on the trained air corridor model, the current position, and the agent positions. The aerial vehicles are controlled to travel from the current positions to the determined next positions, whereby the aerial vehicles are enabled to efficiently use the airspace of the air corridor while maintaining safe distances between each other.

The disclosure enables integration of vast numbers of diverse AAM-based vehicles into the same airspace as conventional aircraft and sUAS, managed by Air Traffic Management (ATM) and Unmanned Aircraft System Traffic Management (UTM) respectively. The described AAM system provides a scalable, flexible, and dynamic system that supports requirements of diverse sizes and types of aircraft and enables those aircraft to efficiently travel between locations without interfering with other types of air traffic. The disclosure operates in an unconventional way by training a MARL-based model using a wide variety of simulated vehicles and situations and then installing the model on each vehicle, such that the vehicles with the model are enables to travel through the associated air corridor safely and efficiently.

The air corridor upon which the model is based is adaptable, such that the volume of the corridor is divided into a plurality of spatio-temporal data cubes, each of which is recursively divisible into sub-cubes, providing adaptable granularity. The data cubes of the air corridor are used by the trained model to provide discrete decision spaces for Markov Decision Processes (MDPs) on each vehicle in the air corridor.

The data cubes used by each vehicle may be sized to fit a minimum safe separation distance that is specific to each vehicle, such that larger vehicles occupy larger data cubes in the air corridor and smaller vehicles occupy smaller data cubes in the air corridor. By optimizing the size of data cubes for each vehicle, the efficiency of the use of the air corridor is improved, as vehicles do not take up unnecessarily large volumes in the air corridor.

The use of reinforcement training techniques on wide varieties and quantities of simulated vehicles enables the disclosure to identify a precise saturation limit of the associated air corridor, such that use of the airspace is optimized while safety is maintained. Additionally, processing tasks involving data cubes of the described air corridor are made efficient using an Octree data structure to represent the adaptable hierarchies of data cubes as described herein.

FIG. 1 is a block diagram illustrating a system 100 for enabling an aerial vehicle 102 to travel in an air corridor while maintaining safe separation from other vehicles (e.g., other agents 122) according to an embodiment. In some examples, the aerial vehicle 102 obtains or otherwise receives an air corridor model 106 from an air corridor model trainer 104. The air corridor model 106 is trained by the air corridor model trainer 104 based on a specifically defined air corridor from an origin location described by origin data 108 to a destination location described by destination data 110 (e.g., a corridor of airspace from an airport location to a downtown location that includes altitude boundaries). Upon obtaining the air corridor model 106, the aerial vehicle 102 is configured to travel along the air corridor with which the air corridor model 106 is associated, as described herein.

In some examples, the aerial vehicle 102 is configured to travel along the air corridor from one position to a next position based on output of the air corridor model 106. The aerial vehicle 102 may be configured to collect or otherwise obtain current position data 114 (e.g., altitude data, velocity data, global positioning system (GPS) data, relative position data with respect to the origin, destination, or another location, etc.) via a position sensor interface 112 and provide the current position data 114 to the air corridor model 106 as input. The air corridor model 106 is trained to process the current position data 114 and determine next position data 124 based on that data 114.

Additionally, or alternatively, the aerial vehicle 102 may be configured to receive or otherwise obtain other agent position data 118 via an inter-agent communication interface 116, which is configured to enable the aerial vehicle 102 to communicate with other agents 122 in the air corridor. The other agent position data 118 may also be provided to the air corridor model 106 as input, such that the next position data 124 determined or generated by the air corridor model 106 is based on the other agent position data 118. In many examples, the aerial vehicle 102 provides both current position data 114 and the other agent position data 118 to the air corridor model 106 to generate the next position data 124 as described herein.

In some examples, the next position data 124 is provided to a vehicle controller 126 of the aerial vehicle 102. The vehicle controller 126 includes hardware, firmware, and/or software configured to control the movement and/or maneuvering of the aerial vehicle 102, including controlling velocity of and direction of the aerial vehicle 102 as it travels through the air. Additionally, or alternatively, the vehicle controller 126 is configured to interpret the next position data 124 and to automatically control the aerial vehicle 102 to move into the position associated with the next position data 124 (e.g., by changing altitude, velocity, and/or direction of travel).

Additionally, or alternatively, in examples where the aerial vehicle 102 is, at least in part, manually piloted or otherwise controlled by a pilot, the next position data 124 may be displayed or otherwise provided to the pilot of the aerial vehicle 102, enabling the pilot to control the aerial vehicle 102 to move to the next position indicated by the next position data 124.

Further, in some examples, the aerial vehicle 102 is configured to share the current position data 114 to the other agents 122 in the air corridor in the form of current position data 120. In such examples, each of the other agents 122 is also using an air corridor model to travel safely through the air corridor and those agents 122 may use of the current position data 120 provided by the aerial vehicle 102 as input to their models. Additionally, in such examples, some or all of the other agents 122 may be configured as aerial vehicle 102 is configured and, to those agents 122, the aerial vehicle 102 is treated as another agent 122, as described herein.

The sharing of current position data 120 between other agents 122 and the aerial vehicle 102 may be further based on a communication range or buffer range, such that agents within the air corridor share their current position data 120 with other agents within the range (e.g., an agent near the origin and an agent near the destination may be too far away to communicate current position data 120 with each other and such data sharing may be unnecessary for determining safe travel in the air corridor for both agents). Such a buffer range may be defined based on the communication capabilities of the agents (e.g., an effective communication range of the hardware, firmware, or software of the agents) and/or based on a communication range required to enable the agents to maintain safe separation (e.g., a minimum range between agents that may be needed for the agents to respond to received current position data 120 and thereby change course to maintain safe separation distances). Other aspects of defining the buffer range may include the velocity at which the agents are traveling and maneuverability of the agents, both of which may affect the agents' abilities to respond to the presence of other agents within the air corridor.

It should be understood that the air corridor model 106 is trained to direct or otherwise enable the aerial vehicle 102 and other agents 122 to travel along the associated air corridor and maintain safe control and safe separation from other agents in the corridor. In some examples, the air corridor model 106 is configured as an adaptable air corridor model as described herein with respect to FIG. 2.

The aerial vehicle 102 and other agents 122 as described herein may include any type of unmanned aerial vehicle (UAV) and/or any type of manned aircraft. For instance, in an example, the aerial vehicle 102 is a UAV while the other agents 122 using the same air corridor include both manned and unmanned aircraft. In other examples, other combinations of unmanned aircraft and manned aircraft, including all unmanned aircraft or all manned aircraft, may be directed through an air corridor without departing from the description.

Figure 2:
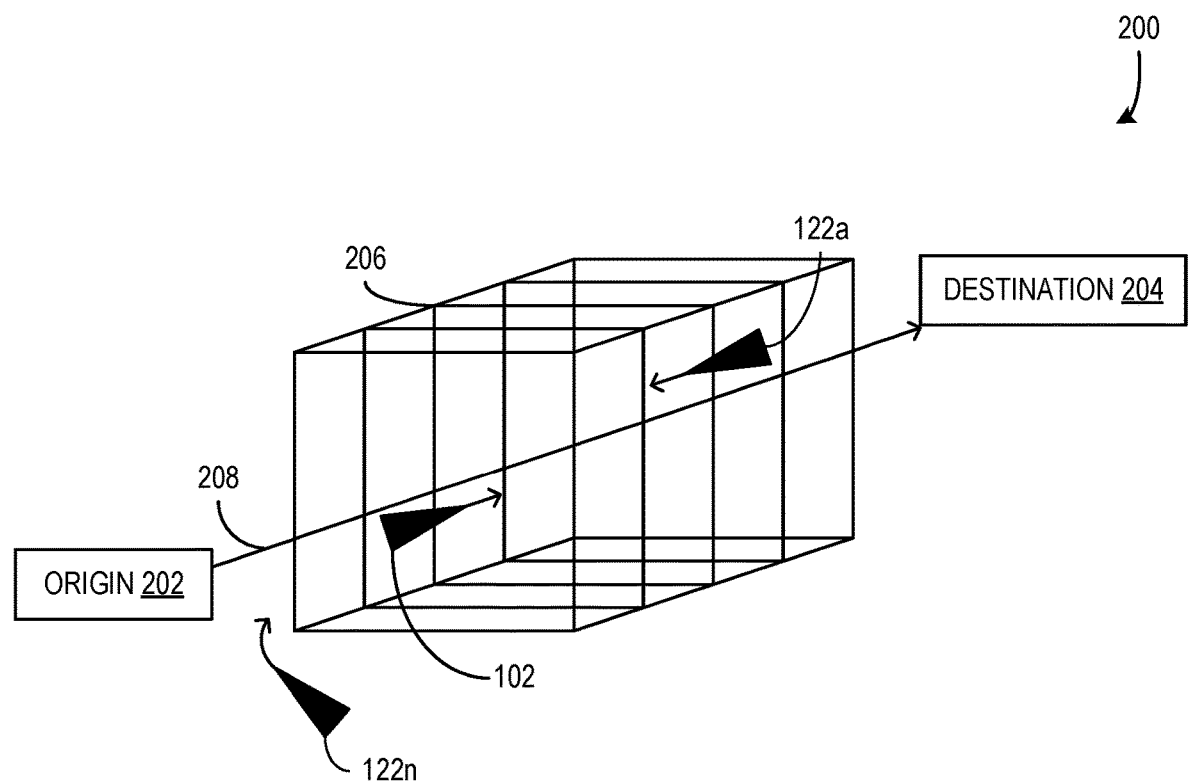
FIG. 2 is a diagram illustrating an air corridor from an origin to a destination according to an embodiment.

FIG. 2 is a diagram illustrating an air corridor 200 from an origin 202 to a destination 204 according to an embodiment. The air corridor 200 is configured as a joint set of airspace volumes in the form of spatio-temporal data cubes 206 between the origin 202 and the destination 204, for use with an air corridor model (e.g., model 106). In some examples, such a model is specifically trained for a particular origin-destination pair, such that the model and the associated air corridor 200 enables aerial vehicles (e.g., aerial vehicle 102, other agents 122a-n) to travel safely between the origin and the destination (in both directions) (e.g., an origin at one or more vertiports/heliports at an airport and a destination at one or more vertiports/heliports in a downtown region of a city), but not between another origin-destination pair. While two other agents 122a and 122n are illustrated, in other examples, more, fewer, or different agents may travel in the air corridor 200 without departing from the description.

More formally, given a reference system R, i.e., three-dimensional (3D) grid network, formed by a set of fixed spatial locations in the 3D space, the center line 208 of an adaptable air corridor 200 is $\overline{AC}$=[r1, r2, ... rn], where ri∈R. Cubes 206 are place around reference points along the center line 208 of the air corridor, building an air corridor 200 composed of the spatio-temporal data cubes 206.

In some examples, the air corridor 200 includes that each cube 206 is considered to have homogeneous weather parameters within during a period of time. Arranged in this manner, the cubes 206 can be considered piece-wise air corridor segments.

Figure 3:
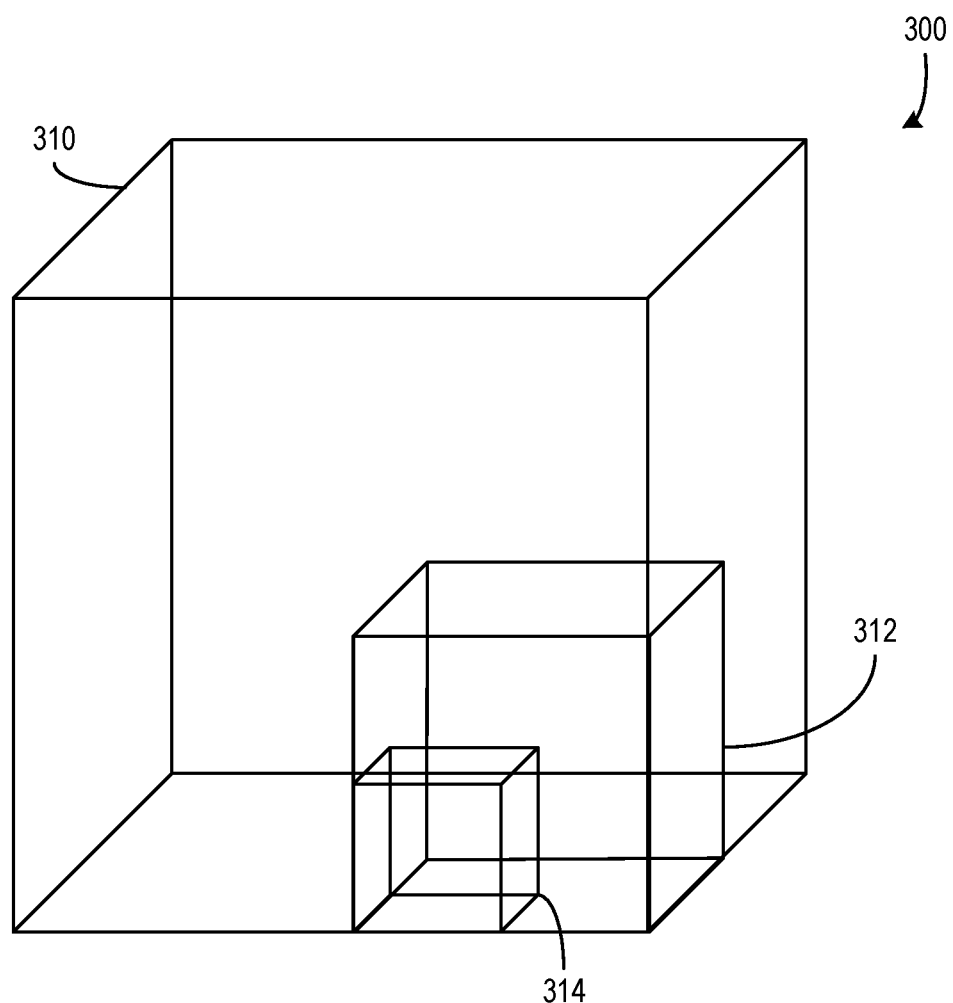
FIG. 3 is a diagram illustrating dynamic adaptation of an air corridor according to an embodiment.

FIG. 3 is a diagram 300 illustrating dynamic adaptation of an air corridor (e.g., air corridor 200) according to an embodiment. The diagram 300 includes a spatio-temporal cube (e.g., of the spatio-temporal cubes 206 of the air corridor 200) that is subdivided into a smaller cube 312, and that cube 312 is subdivided into a still smaller cube 314. The described air corridor 200 is dynamically adaptable (e.g., during operation of an associated air corridor model 106) in that the cubes 206 of the corridor 200 can be expanded, fragmented, or otherwise subdivided as shown in diagram 300 to accommodate varying quantities, types, and/or sizes of air vehicles.

In such examples, the air corridor model 106 and associated air corridor 200 is configured to operate using the rule that only one air vehicle can occupy a cube (e.g., cubes 310, 312, and/or 314) at a given time. The cubes 206 of the air corridor 200 may then be adapted to subdivide the air corridor 200 into a quantity of cubes that enables a plurality of air vehicles to safely travel through the air corridor at substantially the same time, while maintaining a cube size for each air vehicle that is defined to preserve a safe separation distance around the air vehicle (e.g., based on the air vehicle's size and/or other factors associated with safe separation).

More formally, each 3-D segment of the air corridor 200 (e.g., the cubes 206), may be partitioned and/or resized, as illustrated with respect to cubes 310, 312, and 314 of FIG. 3, by recursively subdividing it into eight octants until the granularity level of separation minima (e.g., measurement(s) of the smallest safe cube size) for the AAM system is reached (e.g., which may be associated with the sizes of air vehicles that will use the air corridor). The resulting cubes of the air corridor 200 are then used to define a limited set of states for a Markov Decision Process (MDP) for use in training and/or operating the associated air corridor model 106. In other examples, other methods of training and using the model may be employed.

In some examples, the product of the adaptation process is an air corridor 200 defined as a discrete set of cubes that can be modeled using an Octree data structure. In such examples, use of an Octree data structure to represent the set of cubes of the air corridor enables efficient searching and processing of data associated with those cubes, including identifying safe travel paths and/or conflicts within the cubes of the air corridor. In other examples, other methods of partitioning the air corridor 200 and/or training the associated air corridor model 106 based on those partitions may be used without departing from the description.

Returning to FIG. 1, the air corridor model trainer 104 includes hardware, firmware, and/or software configured to train the air corridor model 106 to maintain and use an air corridor such as air corridor 200, which is representative of a real portion of airspace between the origin, as indicated by the origin data 108, and the destination, as indicated by the destination data 110. In some examples, the air corridor model 106 is trained to predict optimal trajectories for aerial vehicles and/or agents so that they can move forward in in the air corridor in an efficient manner, including maintaining a safe distance between vehicles and/or between vehicles and other obstacles and by maximizing the use of the volume of the adaptable air corridor. The air corridor model 106 may be trained to receive, as input, a quantity of aerial vehicles in the air corridor; size and/or other safe separation distance data of those aerial vehicles; a quantity of vertiports, heliports, and/or other take-off and landing areas at the origin and destination of the air corridor; and/or other data associated with safe separation minima to be used with the air corridor.

In some examples, the air corridor model trainer 104 is configured to use reinforcement learning (RL) techniques to train the air corridor model 106, such as single-agent reinforcement learning (SARL) or multi-agent reinforcement learning (MARL). To perform such training, the air corridor associated with the air corridor model 106 is simulated and then simulated aerial vehicles are directed to travel along the simulated air corridor. The next positions of the simulated aerial vehicles as they travel are determined by the air corridor model 106 as it is being trained, wherein safe decisions may be rewarded while dangerous decisions (e.g., decisions that cause collisions or violations of safe separation distances) are not rewarded or are punished with respect to the model 106 being trained. Thus, safe decisions are reinforced and the model 106 becomes trained to determine safe next positions for aerial vehicles in the air corridor.

Further, among a set of possible safe next positions, next positions that enable aerial vehicles to travel more directly or otherwise efficiently along the air corridor may be rewarded to a greater degree than next positions that are less direct or less efficient, such that the model 106 is also trained to optimize the efficiency of aerial vehicles traveling in the air corridor. Such a process is described in greater detail below with respect to FIGS. 4A-B.

Figure 4A:
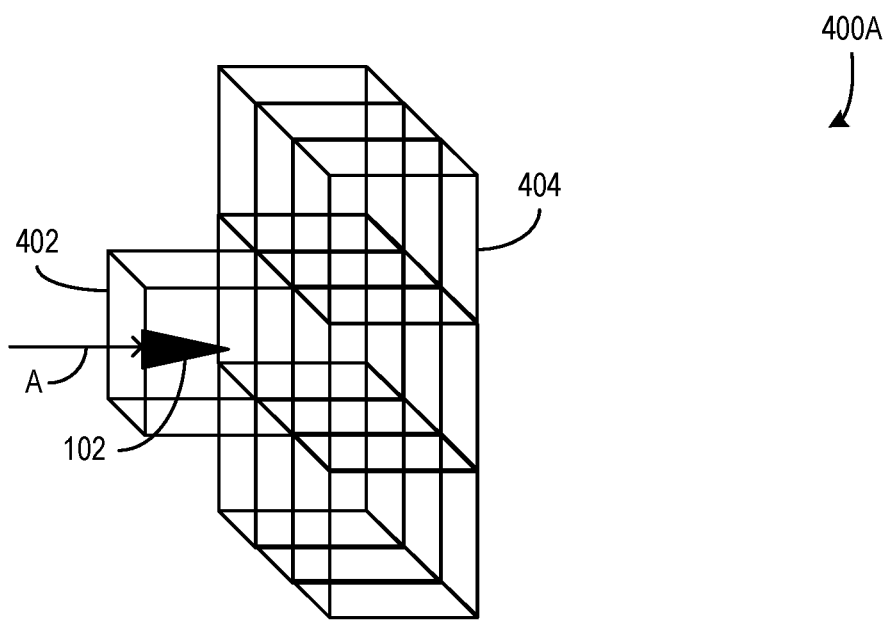
FIGS. 4A-B are diagrams illustrating a determination of a next position cube from a current position cube in an air corridor according to an embodiment.
Figure 4B:
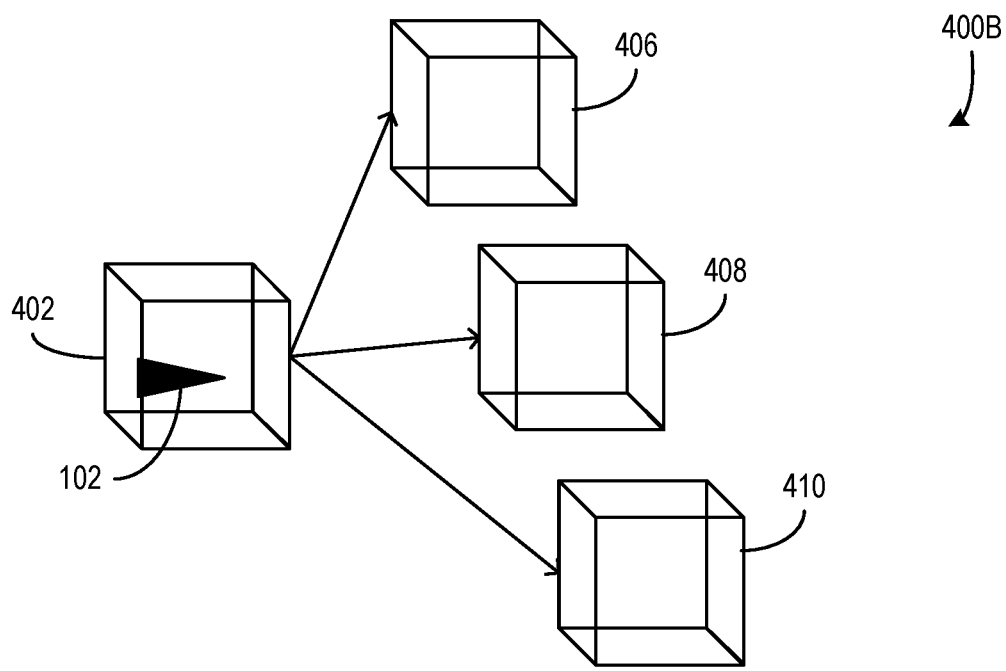

FIGS. 4A-B are diagrams 400A and 400B illustrating a determination of a next position cube from a current position cube 402 in an air corridor (e.g., air corridor 200) according to an embodiment. In some examples, the determination of the next position cube from the current position cube 402 is performed by or based on a trained air corridor model such as air corridor model 106. Such an air corridor model may be trained by an air corridor model trainer such as air corridor model trainer 104 as described herein and it may be used by an aerial vehicle or other agent such as aerial vehicle 102 and/or other agents 122. The diagram 400A includes a current position cube 402 and a plurality of potential next position cubes 404. The current position cube 402 represents a volume of air space in the associated air corridor in which the aerial vehicle 102, which is being controlled or directed by the air corridor model, is located. The determination that the aerial vehicle 102 is currently positioned in the current position cube 402 may be based on current position data (e.g., current position data 114) collected or otherwise obtained by the aerial vehicle 102, such as sensor-collected telemetry data, and/or on extrapolation of the aerial vehicle 102's position from a previous position.

As illustrated by the arrow A, the aerial vehicle 102 in the current position cube 402 is moving from left to right. Thus, the potential next position cubes 404 of the aerial vehicle 102 include nine cubes located to the immediate right (orthogonally or diagonally) of the current position data 114. In other examples, the plurality of potential next position cubes 404 may also include cubes surrounding the current position cube 402 in other directions (e.g., cubes that are up, down, to the side, or some combination thereof from the current position cube 402). However, as the aerial vehicle 102 is traveling from left to right, the potential next position cubes 404 to the right of the cube 402 may be preferable as they enable the aerial vehicle 102 to continue progressing through the air corridor (e.g., air corridor 200). From the perspective of the aerial vehicle 102, the potential next position cubes 404 include cubes that would be entered if the aerial vehicle 102: travels straight forward; travels forward and up; travels forward and down; travels forward and to the right; travels forward to the left; travels forward, right and up; travels forward, left and up; travels forward, right and down; and travels forward, left and down.

The diagram 400B of FIG. 4B illustrates the current position cube 402 and a subset of the potential next position cubes 404, including cubes 406, 408, and 410. Given the current position of the aerial vehicle 102 and position data of other agents (e.g., other agents 122) in the air corridor, the air corridor model (e.g., air corridor model 106) is configured to select from the plurality of potential next position cubes 404. In some examples, model is configured to select one of the next position cubes 404 based on determining or identifying a learned reward or weight value for each potential next position cube and selecting the cube associated with the highest value. The reward values may be assigned to each potential next position cube 404 based on the input position data of the aerial vehicle 102 and any other agents, such that the most efficient cube for traveling through the air corridor that is also a predicted safe trajectory for the aerial vehicle 102 with respect to other agents receives the highest reward value. For instance, if the model has determined that only cubes 406, 408, and 410 are predicted to be safe for the aerial vehicle 102, the reward values of each of the cubes 406, 408, and 410 are the highest values among the potential next position cubes. One of those cubes is likely to have a higher reward value than the other two, such that it is chosen over them (e.g., the cube 408 may be chosen over 406 and 410 for being a safe trajectory that is a more direct or efficient path to the destination).

Returning to FIG. 1, the simulated aerial vehicles used by the air corridor model trainer 104 to train the air corridor model 106 may be configured to select potential next position cubes to travel in the simulated air corridor as described with respect to FIGS. 4A and 4B. This process may occur over many iterations and the air corridor model 106 may be trained and/or tuned based on the results of those iterations, with safe, efficient next position cube decisions being rewarded. In some examples, the training process of the air corridor model 106 includes training the model 106 with a minimum number of agents in the air corridor and then, through training iterations, increasing the number of agents in the air corridor until the air corridor is saturated. The air corridor may be considered to be saturated when adding more agents results in unavoidable collisions or otherwise unsafe behavior of agents while traveling in the air corridor.

As previously described, in some examples, the trained air corridor model 106 is trained an operates according to a decentralized approach, such that each agent in the air corridor uses an air corridor model 106 and those agents are connected by a time-varying and sparse communication network that allows agents to exchange information in the absence of any central controller. Thus, each agent's policy is independent. At each step or position, each agent executes an individual action based on both the local information available, such as current position data 114, as well as on messages sent from other neighboring agents, such as other agent position data 118. The joint goal of all agents is to maximize the average rewards of the decisions of all agents throughout the network of the air corridor. In a policy gradient approach, this translates to optimizing multiple policies simultaneously from a joint reward signal. Such an approach may make learning of heterogeneous policies easier.

In some examples, the decentralized approach includes the use of decentralized actor-critic algorithms based on a policy gradient theorem for MARL. Additionally, the approach may use softmax temporal consistency, derive a primal-dual decentralized optimization method, and propose a value propagation algorithm. These approaches present advantages of scalability to a large number of agents, robustness against malicious attacks, and communication efficiency.

As previously described, the model 106 may be trained to make use of MDP techniques. MDP can be described by a 5-tuple S, A, R, P, γ, where S is the finite state space, A is the finite action space, $P=(P(s'|s,a))_{s,s' \in S, a \in A}$ are the transition probabilities, $R=(R(s, a))_{s,s' \in S, a \in A}$ are the real valued immediate rewards, and $\gamma \in (0, 1)$ is the discount factor. A policy is denoted by π, where $\pi(s_t, a_t)$ is the conditional probability density at $a_t$ with the policy. $V^*(s)=\max_\pi E [\Sigma_{i=1}^\infty \gamma^t R(s_t, a_t)|s_0=s]$ is the optimal value function and it is the unique fixed point of V(s), the Bellman optimality operator.

Further, a networked multi-agent MDP is now described. Let G=(N, E) be an undirected graph with |N|=N agents, where E is the set of edges and $(i, j) \in E$ denotes that agents i and j can communicate with each other via this edge. A networked multi-agent MDP is characterized by a tuple (S, $\{A^i\}_{i \in N}$, P, $\{R^i\}_{i \in N}$, G, γ), where S is the global state space, shared by all the agents in N, $A^i$ is the action space of agent i, $A=\Pi_{i=1}^N A^i$ is the joint action space of all agents, P is the transition probability, and $R^i$ is the local reward function of agent i. In such examples, rewards are observed only locally, and agents observe $s_t$ and make the decision $a^t=(a_1^t, a_2^t, \ldots, a_N^t)$ at each time step. Then, each agent receives only its own reward $R_i(s_t, a_t)$ and the environment switches to the new state $s_{t+1}$ according to the transition probability. Furthermore, since each agent makes its own decision independently, it is reasonable to assume that the policy π (s, a) can be factorized. Due to the fact that the action is executed locally by an agent, and that critic (value) functions are trained locally, this method is fully decentralized, and its objective function is as follows:

$$\min_{\{\theta_{v^i},\theta_{\pi^i}\}_{i=1}^N} \max_{\{\theta_{\rho^i}\}_{i=1}^N} L(\theta_v, \theta_\pi, \theta_\rho) = E_{s,a,s'}\left[\left(\frac{1}{N}\sum_{i=1}^N(\delta_i(s,a,s') - V_i(s))\right)^2\right] -$$

$$\eta E_{s,a,s'}\left[\left(\frac{1}{N}\sum_{i=1}^N(\delta_i(s,a,s') - \rho_i(s,a))\right)^2\right]$$

such that $\theta_{v^1} =, \ldots, = \theta_{v^N}, \theta_{\rho^1} =, \ldots, = \theta_{\rho^N}$, where $\delta_i = R_i(s,a) + \gamma V_i(s') - \lambda N \log \pi^i(s,a^i)$.

The problem space of the decentralized MARL setting is adapted as follows: Each aerial vehicle in the environment is considered an agent and the number of agents N are connected and they change over time $N_t$ in the environment. The environment comprises an adaptable air corridor formed by a set of spatio-temporal data cubes as described herein and a global state $s_t$ is maintained at each time step. The action space $A_t$ of an individual agent specifies where the agent can arrive at the next time step t (e.g., the potential next position cubes 404 of FIG. 4A). Each agent is associated with a reward function at each time step $R_t$ and the i-th agent attempts to maximize its own expected discounted return. The probability of transitioning to a state $s_{t+1}$, given a joint action $a_t$ taken in the current state $s_t$ is the state transition probability. Although the action is deterministic, new vehicles will be available in different cubes in the air corridor at each time and some currently available vehicles will be offline upon arrival at their destinations.

Using this configuration, a separation provision task is specified as a fully cooperative (e.g., all vehicles want to efficiently move forward by maximizing the utilization of the air corridor), partially observable (e.g., each vehicle can observe its own state/position), and sequential multi-agent decision making problem. This task may be addressed using MARL in a setting where the agents are connected via a time-varying and possibly sparse communication network. Each agent's policy is independent in this fully decentralized scheme. Specifically, at each state, each vehicle takes an action, and these actions together determine the next state of the air corridor and the individual reward of each vehicle. In this collaborative setting, the vehicles attempt to maximize the discounted sum of rewards throughout the network.

In other examples, a fully centralized approach or a centralized learning approach may be used when training and using the air corridor model 106. In a fully centralized approach, a joint model for the actions and observations of all the agents in the air corridor is used. A centralized policy maps the joint observations of the agents to a joint action. Hence, with information of all the agents available to a central controller, the problem of controlling the agents in the air corridor reduces to an MDP that can be solved by SARL algorithms. However, this approach may lead to exponential growth of observation and action spaces with a quantity of agents, and the need for the central controller to communicate with each agent presents additional limitations. Such a centralized approach would likely not address the scalability that is offered by the decentralized approach described herein.

In a centralized learning approach, where the model 106 is trained using centralized learning but the use of the model 106 is decentralized among the agents, the focus is on settings where communication between agents is not restricted during learning. Such communication may be performed by a central controller during training. However, during execution of the learned policies, the agents may be able to only communicate via a limited-bandwidth channel. As a result, this approach allows the policy of the model 106 to be trained with the experiences of all agents simultaneously.

In some examples, the described system is configured to operate in air corridors at specified altitudes. For instance, the described system may be configured to operate at altitudes between 400 ft. and 2,500 ft. such that aerial vehicle 102 and other agents 122 operate above the altitude of the established unmanned aircraft system traffic management (UTM) while remaining below the normal operating altitude of other types of aircraft. In other examples, larger, smaller, or different altitude limits may be used without departing from the description.

In some examples, the aerial vehicles operating in the air corridor of the described system are configured to be capable of vertical takeoff and landing (VTOL) and hovering and those capabilities may be accounted for by the model 106 when determining a next position for a vehicle. Additionally, or alternatively, the aerial vehicles operating in the air corridor may include fixed-wing vehicles that are not capable of hovering and/or VTOL, which may result in those vehicles being less flexible regarding the next positions that are safely achievable at a particular time (e.g., such a vehicle may be less flexible regarding changes in velocity, gaining altitude, or otherwise rapidly changing course than hover-capable vehicles). The model 106 may also be trained to account for such limitations, such that next positions for vehicles in the air corridor are determined based on the presence of less maneuverable vehicles in the air corridor.

Further, additional learning may be performed in real-world testing through the use of small, unmanned aircraft systems (sUAS's) in remote locations. Such a process may further enable the verification of the model 106 trained based on simulations and reveal additional real-world considerations that may not be evident based on the training simulations. Still further, once the model 106 is embedded or otherwise installed in the aerial vehicle 102 and/or other agents 122, feedback data gathered during operation of those vehicles may be used to further tune and/or improve the model 106 according to machine learning techniques such as the reinforcement learning described herein.

Figure 5:
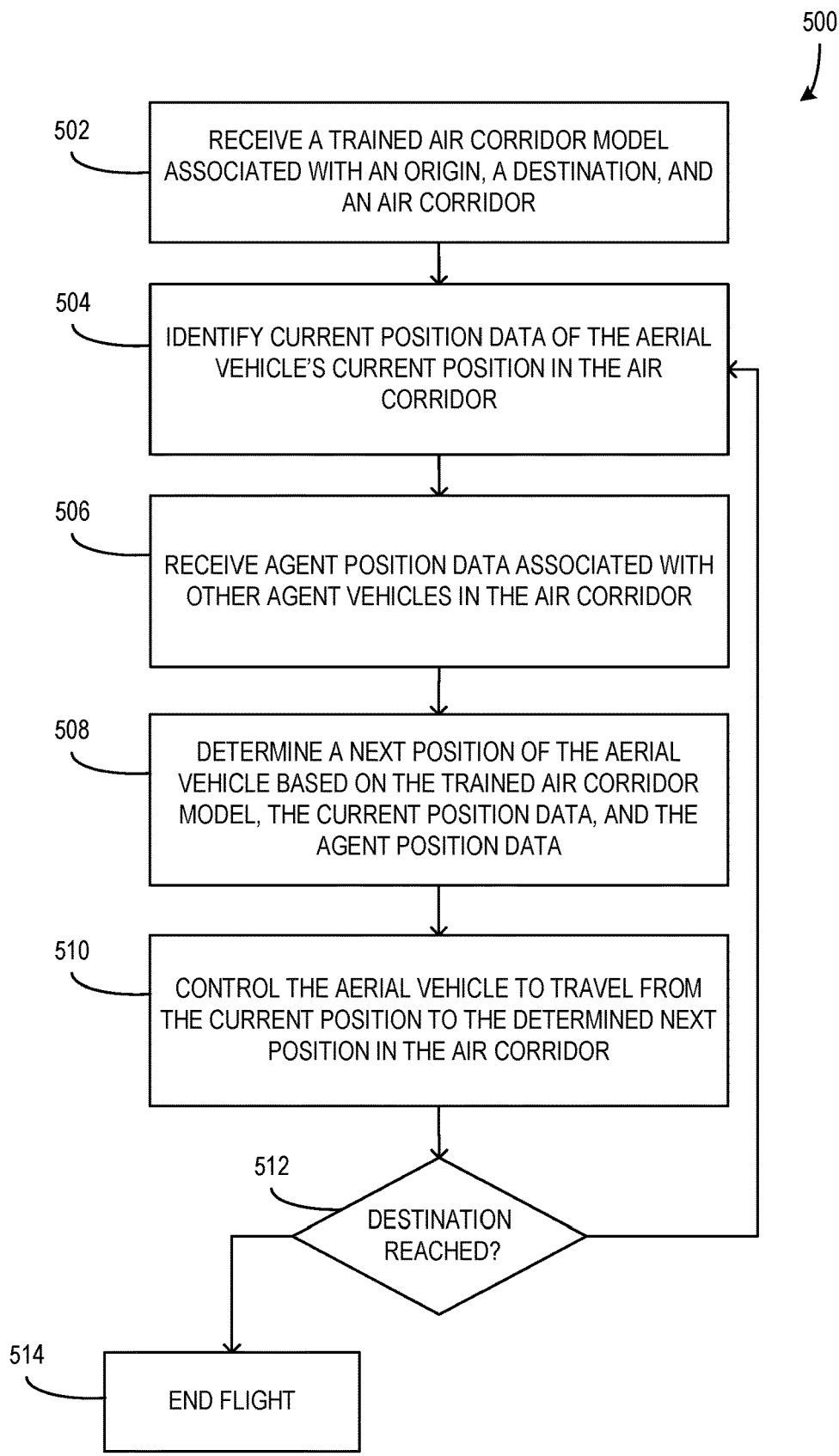
FIG. 5 is a flowchart illustrating a process for controlling an aerial vehicle to travel in an air corridor while maintaining safe separation from other agent vehicles according to an embodiment.

FIG. 5 is a flowchart illustrating a process 500 for controlling an aerial vehicle (e.g., aerial vehicle 102) to travel in an air corridor (e.g., air corridor 200) while maintaining safe separation from other agent vehicles (e.g., other agents 122) according to an embodiment. In some examples, the process 500 is performed or otherwise executed by an aerial vehicle in a system such as system 100 as described herein.

At 502, a trained air corridor model is received that is associated with an origin location, a destination location, and an air corridor therebetween (e.g., a corridor of airspace in a straight line between the origin and destination in a defined altitude range, such as 400 feet to 2500 feet). In some examples, receiving the air corridor model includes the model being embedded or otherwise installed into a computer system of the aerial vehicle, such that the air corridor model may be used by the computer system to influence the control of the aerial vehicle. Further, the trained air corridor model may be configured to enable the aerial vehicle to efficiently travel from the origin to the destination via the air corridor, or from the destination to the origin via the air corridor, while maintaining safe separation distance from other agents traveling in the air corridor or otherwise entering the air corridor (e.g., other conventional aircraft that may interfere with the air corridor when landing on or taking off from a nearby runway).

At 504, current position data of the aerial vehicle's current position in the air corridor is identified. In some examples, the air corridor is represented by a joint set of spatio-temporal data cubes that represent portions of the airspace in the air corridor from the origin to the destination. Further, the air corridor is adaptable by subdividing or expanding data cubes thereof (e.g., subdividing a larger data cube into octants, or eight smaller data cubes that fill the volume of the larger cube or combining a group of eight smaller data cubes into a single larger data cube). Such subdivision and/or expansion of data cubes of the air corridor may be done to accommodate the size and shape of the aerial vehicle, as well as any other features thereof that affect the minimum safe separation distance of the vehicle. The subdivisions and/or expansions may also be based on optimizing the safe, efficient use of the air corridor by multiple agent vehicles up to a saturation limit of the air corridor. For instance, for a particular size of aerial vehicle, the air corridor may be subdivided down to the smallest cubes that preserve the safe separation distance of the aerial vehicle such that, when each cube can only be occupied by one aerial vehicle, the resulting data cubes of the air corridor are efficiently used by a plurality of aerial vehicles. The identified current position data of the aerial vehicle may include an identifier of a data cube within the air corridor, as well as other position information such as altitude, latitude, longitude, distance from the origin and/or destination, etc. Other data that may be collected by the aerial vehicle may include velocity data and/or direction of travel data.

At 506, agent position data associated with other agent vehicles in the air corridor is received. In some examples, the agent position data is received via wireless communication between the aerial vehicle and the other agent vehicles (e.g., a time-varying and sparse communication network that enables the agent vehicles to exchange information in absence of any central controller). Further, the aerial vehicle may provide the identified current position data to the other agent vehicles in the air corridor via the same or a different communication method. The agent position data may include the same or different information as the identified current position data, such as an identifier of the data cubes that the agent vehicles occupy in the air corridor, altitude, latitude, longitude, velocity, and/or direction of travel. Agent position data may also include a safe separation distance of the other agent vehicles (e.g., if one of the other agent vehicles is larger and occupies a larger data cube, the aerial vehicle needs to have that information to properly route a course to avoid collision with the larger vehicle's safe separation distance).

In examples where the data cubes of the air corridor are defined and processed using an Octree data structure, the identifier of the data cube that another agent occupies may include sufficient information to preserve that other agent's safe separation distance due to the nature of the Octree data structure. For instance, if the Octree data structure is represented by hierarchical data values that indicate smaller, more granular data cubes for each hierarchical level, position data that includes a data cube identifier with fewer hierarchical levels indicates that the safe separation distance of the associated agent may be greater than an agent with a data cube identifier with more hierarchical levels (e.g., a identifier of 2.4.6 indicates three levels of hierarchy and that the agent is positioned in the sixth octant of the fourth octant of the second data cube of the air corridor, which is a data cube with $1/64^{th}$ the volume of the associated full data cube, while an identifier of 6.1.2.3 indicates four levels of hierarchy and that the agent is positioned in the third octant of the second octant of the first octant of the sixth data cube in the air corridor, which is a data cube with $1/512^{th}$ the volume of the associated full data cube, representing a shorter safe separation distance than the 2.4.6 identifier).

Additionally, in some examples, the received agent position data is from a subset of agent vehicles in the air corridor that are within a defined buffer range of the aerial vehicle. Such a buffer range may be defined based on requirements for how much lead time is needed for aerial vehicles in the air corridor to avoid collisions safely and efficiently, as described herein. Alternatively, the received agent position data may be received from all of the agent vehicles in the air corridor.

At 508, a next position of the aerial vehicle is determined based on the trained air corridor model, the current position data, and the agent position data. In some examples, the air corridor model is configured to receive the current position data and the agent position data as input and to provide next position data of the next position as output. Further, air corridor model may be trained to determine a set of potential next position data cubes based on the current position data (e.g., the identifier of the current data cube and a direction of travel), determine a reward value for each of the potential next position data cubes based on that current position data and the agent position data of the other agents, and select the potential next position data cube with the highest reward value as the next position for the aerial vehicle. The other agent vehicles in the air corridor may also determine their next positions in substantially the same manner, and the trained air corridor model of the aerial vehicle may be trained to determine reward values for potential next position data cubes based, at least in part, on other agents in the air corridor also selecting next positions using such a model.

At 510, the aerial vehicle is controlled to travel from the current position to the determined next position in the air corridor. In some examples, the air vehicle is controlled to travel from a current position data cube to a next position data cube in the set of data cubes that make up the air corridor. Such controlling of the aerial vehicle may include one or more of the following: accelerating the aerial vehicle, decelerating the aerial vehicle, causing the aerial vehicle to gain altitude, causing the aerial vehicle to lose altitude, causing the aerial vehicle to change direction or heading, and causing the aerial vehicle to maintain its current direction or heading. In many examples, the aerial vehicles are controlled automatically by one or more computing systems, but in other examples, some portion of the vehicle control may be manual. In such systems with at least partial manual control, the next position of the aerial vehicle may be communicated to the pilot or other controlling user of the aerial vehicle, which may include indicating a direction toward the next position and/or indicating a control or controls to adjust to cause the aerial vehicle to travel to the next position. In such examples, the automatically controlled aircraft may be configured to give precedence to manually controlled aircraft in the air corridor and additional strategic planning may be involved to ensure that human pilots are enabled to perform any necessary maneuvers.

At 512, if the aerial vehicle has reached the destination, the process proceeds to 514. Alternatively, if the aerial vehicle has not reached the destination, the process returns to 504, at which point, the process from 504-510 to determine and travel to a next position is performed again. As a result, the aerial vehicle is controlled to travel down the air corridor from position to position, with each next position being determined based on the air corridor model and up-to-date position data of the aerial vehicle and any nearby agent vehicles that have communicated their own position data. At 514, the flight of the aerial vehicle ends (e.g., by landing at a heliport, vertiport, or in another defined landing zone).

In some examples, the controlling of the aerial vehicles to take off from and/or land at the origin or destination of an air corridor may be performed in another way prior to the aerial vehicles entering the associated air corridor, which may be elevated off the ground and above the landing zones. For instance, the number of vehicles allowed to take off or land at a particular endpoint of an air corridor may be based on the number of heliports or vertiports that are available at that location. Alternatively, or additionally, if a landing zone of an endpoint is located within the air corridor, the air corridor model may be trained to control the aerial vehicle to take off from and/or land at that landing zone. Other methods of controlling the takeoff and landing of the aerial vehicles at the end points of air corridors may be used without departing from the description herein.

Figure 6:
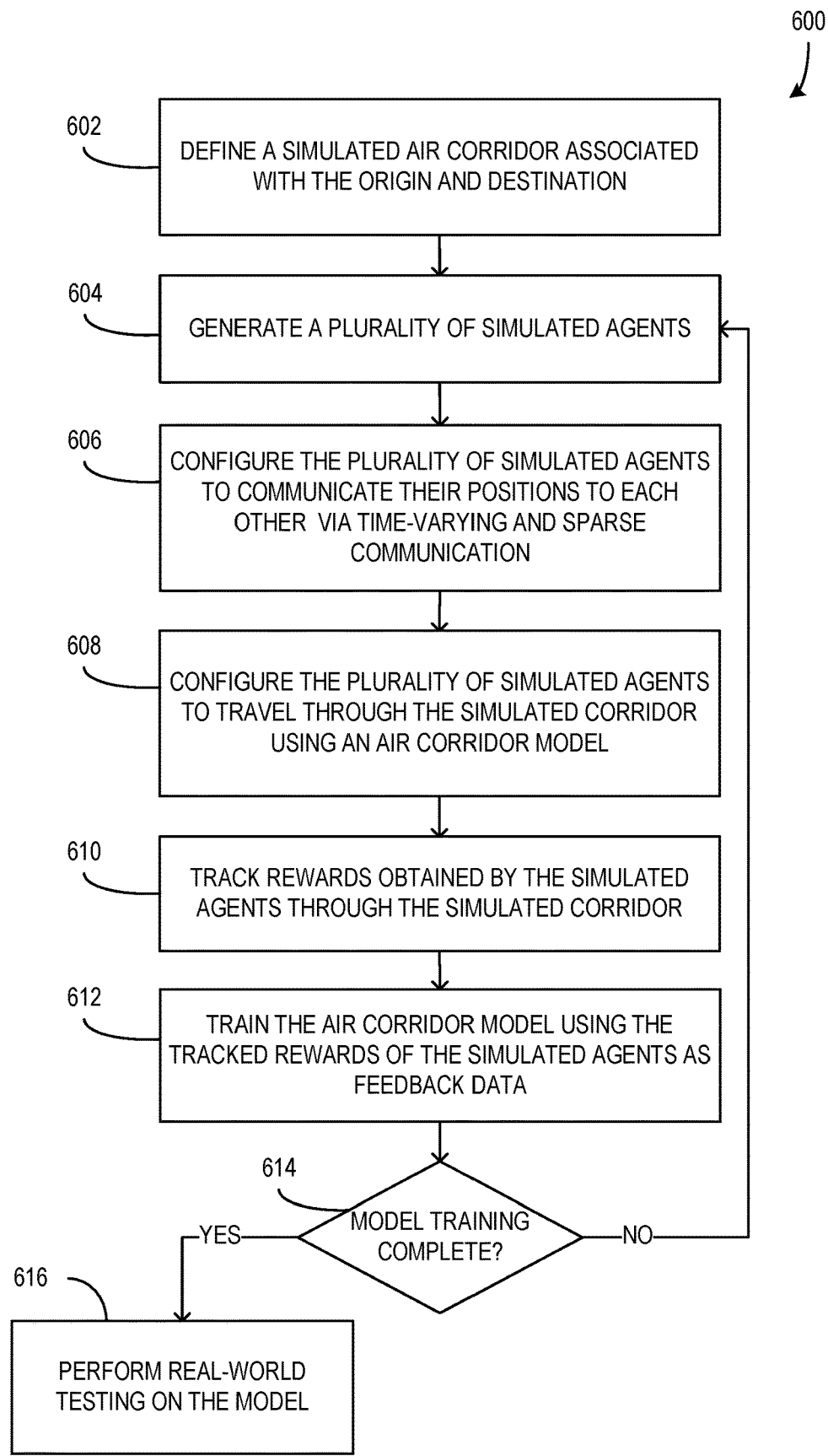
FIG. 6 is a flowchart illustrating a process for training an air corridor model according to an embodiment.

FIG. 6 is a flowchart illustrating a process 600 for training an air corridor model (e.g., air corridor model 106) according to an embodiment. In some examples, the process 600 is performed by a system, such as system 100, and/or components thereof, such as the air corridor model trainer 104, as described herein. At 602, a simulated air corridor associated with the origin and destination is defined. In some examples, a model must be trained based on a specific origin-destination pair. Defining the simulated air corridor may include defining the joint set of spatio-temporal data cubes as described above.

At 604, a plurality of simulated agents is generated and, at 606, the plurality of simulated agents is configured to communicate their positions in the air corridor to each other via time-varying and sparse communication, such that the limited communication of the real-world system is simulated. At 608, those simulated agents are configured to travel through the simulated corridor using the air corridor model that is being trained. Those simulated agents are then sent down the air corridor in varying arrangements, organizations, orders, and timings.

At 610, as the simulated agents travel down the air corridor, the rewards obtained by the agents are tracked. In some examples, the simulated agents use an MDP based on the air corridor model to determine next positions as described herein. The air corridor model is configured to determine rewards for potential next positions of each simulated agent at each point in time, as described herein. Collisions between simulated agents may be assigned very low reward values or even negative reward values to disincentivize such behavior.

At 612, the tracked rewards of the simulated agents are used as feedback data to train the air corridor model. The model may be tuned to improve the rewards of next position decisions that resulted in simulated agents successfully reaching a destination, while next position decisions that led to collisions or inefficient travel may have reduced rewards. Training of the air corridor model may be based on RL techniques, such as MARL, as described herein.

If, at 614, the model training is not yet complete, the process returns to 604 perform another iteration of the described simulation to further tune the air corridor model. Alternatively, if the model training is complete at 614, the process proceeds to 616, where real-world testing may be performed on the model. For instance, unmanned air taxis may be configured to use the trained model and controlled to travel down an air corridor in a remote region to confirm the operation of the model in the real world and/or identify any issues that were not identified during the simulation.

Exemplary Operating Environment

Figure 7:
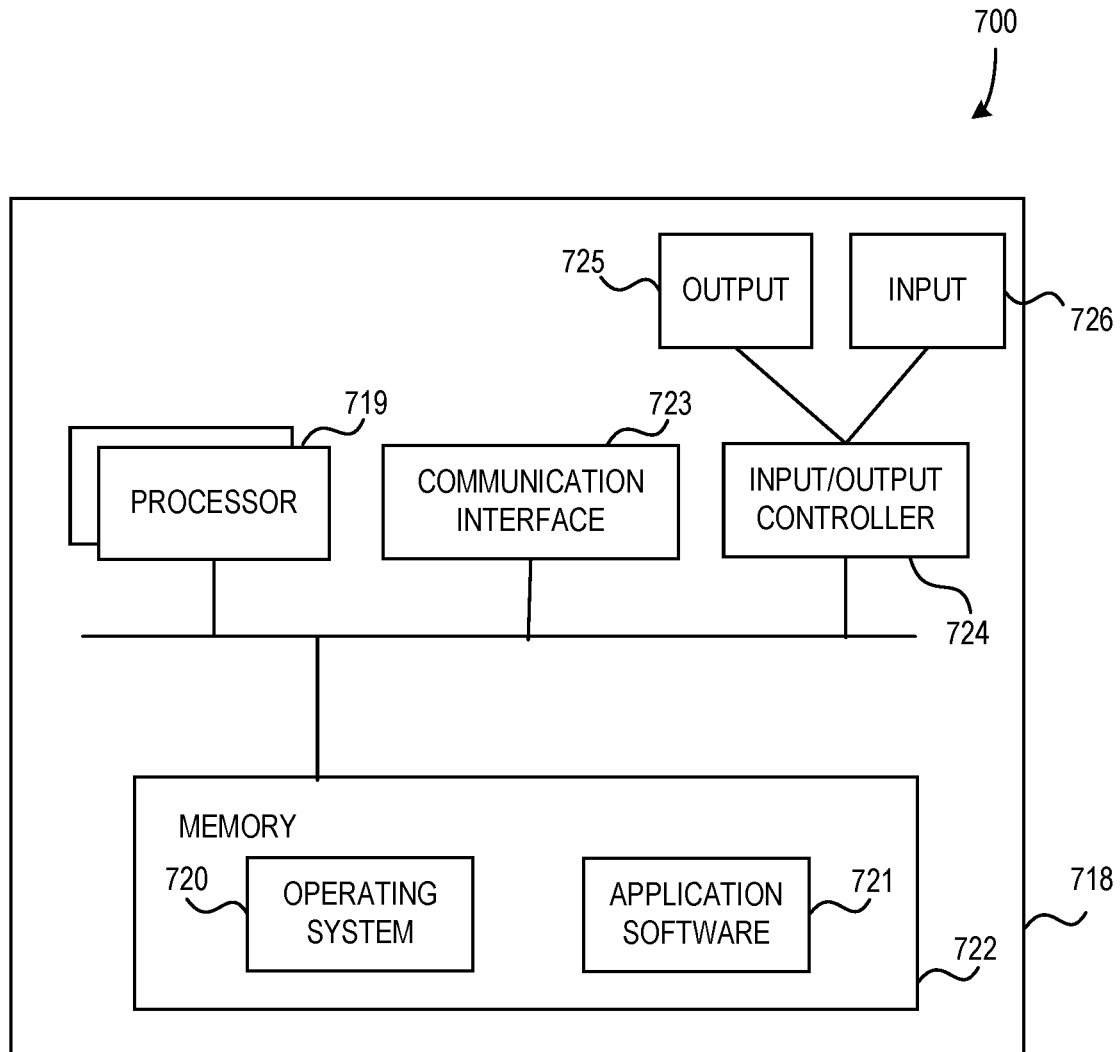
FIG. 7 illustrates a computing apparatus according to an embodiment as a functional block diagram.

The present disclosure is operable with a computing apparatus according to an embodiment as a functional block diagram 700 in FIG. 7. In an embodiment, components of a computing apparatus 718 may be implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. Platform software comprising an operating system 720 or any other suitable platform software may be provided on the apparatus 718 to enable application software 721 to be executed on the device. According to an embodiment, controlling aerial vehicles to travel in an air corridor while maintaining safe separation distance using a trained air corridor model as described herein may be accomplished by software, hardware, and/or firmware.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g., using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone, or a touchpad. In one embodiment, the output device 725 may also act as the input device. An example of such a device may be a touch sensitive display. The input/output controller 724 may also output data to devices other than the output device, e.g., a locally connected printing device. In some embodiments, a user may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system for controlling an aerial vehicle to travel in an air corridor while maintaining safe separation from other agent vehicles comprises: a processor; and a non-transitory computer readable medium having stored thereon program code for transferring data to another computer system, the program code causing the processor to: receive a trained air corridor model associated with an origin, a destination, and an air corridor representative of airspace between the origin and the destination, wherein the trained air corridor model is configured to maintain safe separation distance between vehicles in the air corridor; identify current position data representing a current position of the aerial vehicle in the air corridor; receive agent position data associated with a position of at least one agent vehicle in the air corridor; and determine a next position of the aerial vehicle in the air corridor based on the trained air corridor model, the current position data, and the agent position data.

An example computerized method for controlling an aerial vehicle to travel in an air corridor while maintaining safe separation from other agent vehicles comprises: receiving, by a processor of an aerial vehicle, a trained air corridor model associated with an origin, a destination, and an air corridor representative of airspace between the origin and the destination, wherein the trained air corridor model is configured to maintain safe separation distance between vehicles in the air corridor; identifying, by the processor, current position data representing a current position of the aerial vehicle in the air corridor; receiving, by the processor, agent position data associated with a position of at least one agent vehicle in the air corridor; and determining, by the processor, a next position of the aerial vehicle in the air corridor based on the trained air corridor model, the current position data, and the agent position data.

A non-transitory computer storage medium having stored thereon program code executable by a first computer system at a first site, the program code embodying a method that comprises: receiving, by an aerial vehicle, a trained air corridor model associated with an origin, a destination, and an air corridor that is representative of airspace between the origin and the destination, wherein the trained air corridor model is configured to maintain safe separation between vehicles in the air corridor; identifying current position data representing a current position of the aerial vehicle in the air corridor; receiving agent position data associated with a position of at least one agent vehicle in the air corridor; and determining a next position of the aerial vehicle in the air corridor based on the trained air corridor model, the current position data, and the agent position data.

Alternatively, or in addition to the other examples described herein, examples include any combination of the following:

wherein the air corridor includes a joint set of spatio-temporal data cubes that represent portions of airspace in the air corridor from the origin to the destination; and wherein at least one data cube of the joint set of spatio-temporal data cubes is subdivided into a plurality of data sub-cubes, wherein a size of the data sub-cubes is based on a defined minimum safe separation distance.

wherein identifying the current position data of the current position of the aerial vehicle in the air corridor includes identifying a current data sub-cube of the air corridor in which the aerial vehicle is currently positioned; and wherein determining the next position of the aerial vehicle in the air corridor based on the trained air corridor model, the current position data, and the agent position data includes determining a next data sub-cube of the air corridor that is adjacent to the identified current data sub-cube.

wherein determining the next position of the aerial vehicle in the air corridor based on the trained air corridor model includes adapting the air corridor based on the trained air corridor model to optimize use of the air corridor, wherein the adapting includes at least one of the following: subdividing a data cube of the air corridor into octant sub-cubes of the air corridor and combining sub-cubes of the air corridor into a larger cube of the air corridor.

wherein the program code further causes the processor to send the identified current position data to the at least one agent vehicle in the air corridor.

further comprising, controlling the aerial vehicle to travel from the current position to the determined next position in the air corridor including at least one of the following: accelerating the aerial vehicle, decelerating the aerial vehicle, causing the aerial vehicle to gain altitude, causing the aerial vehicle to lose altitude, and causing the aerial vehicle to change direction.

wherein the air corridor includes airspace from an altitude of 400 feet to an altitude of 2500 feet.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for receiving, by a processor of an aerial vehicle, a trained air corridor model associated with an origin, a destination, and an air corridor representative of airspace between the origin and the destination, wherein the trained air corridor model is configured to maintain safe separation distance between vehicles in the air corridor; exemplary means for identifying, by the processor, current position data representing a current position of the aerial vehicle in the air corridor; exemplary means for receiving, by the processor, agent position data associated with a position of at least one agent vehicle in the air corridor; and exemplary means for determining, by the processor, a next position of the aerial vehicle in the air corridor based on the trained air corridor model, the current position data, and the agent position data.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer system for controlling an aerial vehicle to travel in an air corridor while maintaining safe separation from other agent vehicles, the computer system comprising:
   a processor; and
   a non-transitory computer readable medium having stored thereon program code for transferring data to another computer system, the program code causing the processor to:
   receive a trained air corridor model associated with an origin, a destination, and an air corridor representative of airspace between the origin and the destination, wherein the trained air corridor model is configured to maintain safe separation distance between vehicles in the air corridor;
   identify current position data representing a current position of the aerial vehicle in the air corridor;
   receive agent position data associated with a position of at least one agent vehicle in the air corridor; and
   determine a next position of the aerial vehicle in the air corridor based on the trained air corridor model, the current position data, and the agent position data.

2. The computer system of claim 1, wherein the air corridor includes a joint set of spatio-temporal data cubes that represent portions of airspace in the air corridor from the origin to the destination; and wherein at least one data cube of the joint set of spatio-temporal data cubes is subdivided into a plurality of data sub-cubes, wherein a size of the data sub-cubes is based on a defined minimum safe separation distance.

3. The computer system of claim 2, wherein identifying the current position data of the current position of the aerial vehicle in the air corridor includes identifying a current data sub-cube of the air corridor in which the aerial vehicle is currently positioned; and wherein determining the next position of the aerial vehicle in the air corridor based on the trained air corridor model, the current position data, and the agent position data includes determining a next data sub-cube of the air corridor that is adjacent to the identified current data sub-cube.

4. The computer system of claim 2, wherein determining the next position of the aerial vehicle in the air corridor based on the trained air corridor model includes adapting the air corridor based on the trained air corridor model to optimize use of the air corridor, wherein the adapting includes at least one of the following: subdividing a data cube of the air corridor into octant sub-cubes of the air corridor and combining sub-cubes of the air corridor into a larger cube of the air corridor.

5. The computer system of claim 1, wherein the program code further causes the processor to send the identified current position data to the at least one agent vehicle in the air corridor.

6. The computer system of claim 1, further comprising, controlling the aerial vehicle to travel from the current position to the determined next position in the air corridor including at least one of the following: accelerating the aerial vehicle, decelerating the aerial vehicle, causing the aerial vehicle to gain altitude, causing the aerial vehicle to lose altitude, and causing the aerial vehicle to change direction.

7. The computer system of claim 1, wherein the air corridor includes airspace from an altitude of 400 feet to an altitude of 2500 feet.

8. A computerized method for controlling an aerial vehicle to travel in an air corridor while maintaining safe separation from other agent vehicles, the method comprising:

receiving, by a processor of an aerial vehicle, a trained air corridor model associated with an origin, a destination, and an air corridor representative of airspace between the origin and the destination, wherein the trained air corridor model is configured to maintain safe separation distance between vehicles in the air corridor;

identifying, by the processor, current position data representing a current position of the aerial vehicle in the air corridor;

receiving, by the processor, agent position data associated with a position of at least one agent vehicle in the air corridor; and determining, by the processor, a next position of the aerial vehicle in the air corridor based on the trained air corridor model, the current position data, and the agent position data.

9. The computerized method of claim 8, wherein the air corridor includes a joint set of spatio-temporal data cubes that represent portions of airspace in the air corridor from the origin to the destination; and wherein at least one data cube of the joint set of spatio-temporal data cubes is subdivided into a plurality of data sub-cubes, wherein a size of the data sub-cubes is based on a defined minimum safe separation distance.

10. The computerized method of claim 9, wherein identifying the current position data of the current position of the aerial vehicle in the air corridor includes identifying a current data sub-cube of the air corridor in which the aerial vehicle is currently positioned; and wherein determining the next position of the aerial vehicle in the air corridor based on the trained air corridor model, the current position data, and the agent position data includes determining a next data sub-cube of the air corridor that is adjacent to the identified current data sub-cube.

11. The computerized method of claim 9, wherein determining the next position of the aerial vehicle in the air corridor based on the trained air corridor model includes adapting the air corridor based on the trained air corridor model to optimize use of the air corridor, wherein the adapting includes at least one of the following: subdividing a data cube of the air corridor into octant sub-cubes of the air corridor and combining sub-cubes of the air corridor into a larger cube of the air corridor.

12. The computerized method of claim 8, further comprising sending, by the processor, the identified current position data to the at least one agent vehicle in the air corridor.

13. The computerized method of claim 8, further comprising, controlling the aerial vehicle to travel from the current position to the determined next position in the air corridor including at least one of the following: accelerating the aerial vehicle, decelerating the aerial vehicle, causing the aerial vehicle to gain altitude, causing the aerial vehicle to lose altitude, and causing the aerial vehicle to change direction.

14. The computerized method of claim 8, wherein the air corridor includes airspace from an altitude of 400 feet to an altitude of 2500 feet.

15. A non-transitory computer storage medium having stored thereon program code executable by a first computer system at a first site, the program code embodying a method comprising:

receiving, by an aerial vehicle, a trained air corridor model associated with an origin, a destination, and an air corridor that is representative of airspace between the origin and the destination, wherein the trained air corridor model is configured to maintain safe separation between vehicles in the air corridor;

identifying current position data representing a current position of the aerial vehicle in the air corridor;

receiving agent position data associated with a position of at least one agent vehicle in the air corridor; and determining a next position of the aerial vehicle in the air corridor based on the trained air corridor model, the current position data, and the agent position data.

16. The non-transitory computer storage medium of claim 15, wherein the air corridor includes a joint set of spatio-temporal data cubes that represent portions of airspace in the air corridor from the origin to the destination; and wherein at least one data cube of the joint set of spatio-temporal data cubes is subdivided into a plurality of data sub-cubes, wherein a size of the data sub-cubes is based on a defined minimum safe separation distance.

17. The non-transitory computer storage medium of claim 16, wherein identifying the current position data of the current position of the aerial vehicle in the air corridor includes identifying a current data sub-cube of the air corridor in which the aerial vehicle is currently positioned; and wherein determining the next position of the aerial vehicle in the air corridor based on the trained air corridor model, the current position data, and the agent position data includes determining a next data sub-cube of the air corridor that is adjacent to the identified current data sub-cube.

18. The non-transitory computer storage medium of claim 16, wherein determining the next position of the aerial vehicle in the air corridor based on the trained air corridor model includes adapting the air corridor based on the trained air corridor model to optimize use of the air corridor, wherein the adapting includes at least one of the following: subdividing a data cube of the air corridor into octant sub-cubes of the air corridor and combining sub-cubes of the air corridor into a larger cube of the air corridor.

19. The non-transitory computer storage medium of claim 15, the method embodied by the program code further comprising sending the identified current position data to the at least one agent vehicle in the air corridor.

20. The non-transitory computer storage medium of claim 15, wherein the method embodied by the program code further comprises, controlling the aerial vehicle to travel from the current position to the determined next position in the air corridor including at least one of the following: accelerating the aerial vehicle, decelerating the aerial vehicle, causing the aerial vehicle to gain altitude, causing the aerial vehicle to lose altitude, and causing the aerial vehicle to change direction.

\* \* \* \* \*